US007946006B2

(12) United States Patent
Thompson

(10) Patent No.: US 7,946,006 B2
(45) Date of Patent: May 24, 2011

(54) CARABINER HAVING DUAL GATES AND ASSOCIATED METHODS

(75) Inventor: Rocke P. Thompson, Bountiful, UT (US)

(73) Assignee: Techxotic, L.C., Clearfield, UT (US)

( * ) Notice: Subject to any disclaimer, the term of this patent is extended or adjusted under 35 U.S.C. 154(b) by 948 days.

(21) Appl. No.: 11/827,380

(22) Filed: Jul. 10, 2007

(65) Prior Publication Data
US 2008/0022497 A1    Jan. 31, 2008

Related U.S. Application Data

(60) Provisional application No. 60/819,778, filed on Jul. 10, 2006.

(51) Int. Cl.
*F16B 45/02* (2006.01)
(52) U.S. Cl. ........... 24/599.1; 24/592.11; 24/601.5; 24/601.7; 294/82.19; 294/82.2
(58) Field of Classification Search ............ 24/592.11, 24/599.1, 598.7, 601.5, 601.7; 294/82.2, 294/82.19
See application file for complete search history.

(56) References Cited

U.S. PATENT DOCUMENTS

| 644,699 A * | 3/1900 | Woodford ............ 294/82.2 |
| 797,941 A * | 8/1905 | Corbett ................ 24/599.5 |
| 1,442,101 A | 1/1923 | Smith |
| 1,886,726 A | 11/1932 | Pennefather |
| 4,930,194 A | 6/1990 | Frechin |
| 5,005,266 A | 4/1991 | Fister et al. |
| 5,187,844 A | 2/1993 | Simond |
| 5,329,675 A | 7/1994 | McLean et al. |
| 5,357,657 A | 10/1994 | Petzl |
| 5,361,726 A | 11/1994 | Harris et al. |
| 5,384,943 A | 1/1995 | LeFebvre et al. |
| 5,416,955 A | 5/1995 | Katsma |
| 5,463,798 A | 11/1995 | Wurzer |
| 5,480,202 A * | 1/1996 | Gloden ................ 294/82.2 |
| 5,577,304 A | 11/1996 | Simond |
| 5,608,953 A | 3/1997 | Petzl et al. |

(Continued)

FOREIGN PATENT DOCUMENTS
EP     0 376 860 B1    2/1992
(Continued)

OTHER PUBLICATIONS (EPO) English Translation of FR 2,766,884, 6 pages, received on Jul. 1, 2010.*

(Continued)

*Primary Examiner* — Robert J Sandy
(74) *Attorney, Agent, or Firm* — TraskBritt

(57) ABSTRACT

Various embodiments for carabiners include two gates. The carabiners include a C-shaped body having a nose region and an end region. An inner gate is configured to pivot about the end region from a closed position in contact with the nose region, and an open position, wherein the inner gate pivots toward the spine of the C-shaped body. An outer gate is configured to pivot about the end region from a closed position in contact with the nose region, and an open position, extending away from the C-shaped body. The inner and the outer gate may each comprise wire gates, alternatively one gate may comprise a generally cylindrical gate and the other gate may comprise a wire gate. Methods include preventing a carabiner from opening.

17 Claims, 7 Drawing Sheets

U.S. PATENT DOCUMENTS

| | | | |
|---|---|---|---|
| 5,791,025 | A | 8/1998 | Maurice et al. |
| 5,896,630 | A | 4/1999 | Smith et al. |
| 6,588,076 | B1 | 7/2003 | Choate |
| 6,622,354 | B1 | 9/2003 | Klingier |
| 7,051,410 | B2 * | 5/2006 | Simond ................ 24/599.1 |
| 2002/0050032 | A1 | 5/2002 | Carnall |
| 2002/0073520 | A1 | 6/2002 | Hall |
| 2003/0106190 | A1 | 6/2003 | Christianson |
| 2003/0167608 | A1 | 9/2003 | Petzl et al. |
| 2004/0143945 | A1 | 7/2004 | Christianson |
| 2005/0011058 | A1 * | 1/2005 | Simond ................ 24/599.1 |
| 2005/0246875 | A1 | 11/2005 | Brown |

FOREIGN PATENT DOCUMENTS

| | | |
|---|---|---|
| EP | 0 976 936 A1 | 2/2000 |
| EP | 1 178 227 A1 | 6/2002 |
| EP | 1 229 258 A2 | 8/2002 |
| FR | 2766884 A1 * | 2/1999 |
| FR | 2 856 309 A | 12/2004 |

OTHER PUBLICATIONS

Rescue Equipment, CMC Resuce OX Steel Carabiner, CMC Rescue Inc., 2003, 1 page, cmcrescue.com.

Abseil & Belay Equipment, DMM International, Jul. 2000, 2 pages.

PCT International Search Report, PCT/US2005/003116, dated May 31, 2005.

Black Diamond, "LiveWire Carabiner," <<http://www.bdel.com/gear/livewire.php>> 2005.

Captive Eye, DMM Industrial Website, 1 page, at least as early as Jan. 27, 2005.

Locking Carabiners, DMM Industrial Website, 1 page, at least as early as Jan. 27, 2005.

DMM Belay Master Karabiners, DMM International, July, 11 pages, at least as early as Jan. 27, 2005.

\* cited by examiner

CARABINER HAVING DUAL GATES AND ASSOCIATED METHODS

CROSS-REFERENCE TO RELATED APPLICATIONS

This application claims the benefit of U.S. Provisional Application Ser. No. 60/819,778 filed Jul. 10, 2006, the disclosure of which is incorporated in its entirety herein by this reference.

FIELD OF THE INVENTION

The present invention relates to a carabiner. More particularly, the present invention relates to a carabiner having dual gates.

BACKGROUND

Carabiners are used for various applications in many different activities. Carabiners are typically associated with outdoor recreational activities, such as rock climbing, mountaineering, mountain rescue work, and sailing. However, carabiners are also employed in applications such as rescue work in urban and industrial settings, safety restraints in urban and industrial settings, law enforcement work, and military applications among many other applications.

Conventionally, a carabiner has a ring, or C-shaped body, having a gate, which may be opened to insert a rope, sling, or a belay/rappel device (e.g., a figure eight device or another belay/rappel device). The gate is shut, typically, by a spring that urges the gate closed. The gate may be a wire gate, comprising a loop of wire that may be biased toward the closed position. Oftentimes, the gate may be further secured in a closed position by a locking mechanism known as a sleeve, which locks the gate to prevent opening thereof.

Typically, a carabiner may have an elongated shape, such as an oval or a D-shape. FIG. 1A shows a conventional carabiner 100 having a generally C-shaped body 102 and a gate 104 pivotally secured thereto at a rivet area 110 of the C-shaped body 102. The elongated region of the body 102 is known as the spine 118 of the carabiner 100. The gate 104 may be pivoted inward, toward the spine 118, to an open position as shown in FIG. 1A. The carabiner 100 is depicted as a "locking" carabiner, having a sleeve 112 that may be employed to lock the gate 104 when it is closed. The gate 104 engages with a nose region 114 of the C-shaped body 102 when in a closed position, shown in FIG. 1B. The gate 104 includes a receptacle for receiving the nose region 114. The nose region 114 may flare outward at the proximal end 116, to abut the gate 104 during loading of the carabiner. A carabiner having such a gate/nose interface may be referred to as a keylock carabiner.

Conventional carabiners without a sleeve are known as "non-locking carabiners," or simply as "carabiners." Non-locking carabiners may be preferred in certain situations because they may be opened and closed more quickly, and are generally less expensive and lighter than locking carabiners. Non-locking carabiners have disadvantages. For example, a non-locking carabiner is more susceptible to having the gate pushed open, and becoming unclipped. A rappel device that is clipped into a carabiner may lever against the gate, pushing the gate open and enabling the rappel device to slip free. In another application, a carabiner may be clipped to a bolt hanger, which is attached to a bolt in a rock face. The carabiner may become twisted, with the gate against the bolt hanger, pushing the gate open and enabling the carabiner to unclip itself from the bolt hanger. A carabiner clipped to another object or device, such as another carabiner, a jumar, or a pulley, might also rotate to a position from which the gate is levered open and the carabiner is inadvertently unclipped.

The gate of a non-locking carabiner may also be inadvertently opened when the carabiner is pushed against a rock face or other object. This is dangerous, not only because the carabiner may become unclipped and detached from the object to which it is attached or a rope passing through the carabiner may become unclipped and detached, but also because the strength of the carabiner is compromised with the gate in an open position.

In certain falls, particularly when a rope has been "back-clipped," the rope may cross back over the gate of the carabiner as the falling climber plummets past, levering the gate open. The rope may become unclipped and detached from the carabiner, causing the climber to fall further. Ideally, as the climber scales the cliff, a rope reaches from a belayer on the ground, up through at least one carabiner, which is attached to the cliff face and tied at the end to the climber. The rope should thread through the opening 130 of the carabiner from the ground, under the spine 118 of the carabiner 100, through the opening, and over the gate 104 to the climber. If the rope threads from the ground, over the spine 118 of the carabiner, and under the gate 104 as it continues upward to the carabiner, the rope is back-clipped. The rope passing under the gate 104 may cross over the gate if the climber falls.

Even with the use of a locking carabiner, the sleeve 112 may be a point of failure. For example the ability of the sleeve 112 to resist failure under an inward force may be much less than the overall strength of the carabiner. Carabiners manufactured for climbing use have a strength rating for tensile loading along their major axis 106, and a lesser strength rating along the minor axis 108. Carabiners do not have a minimum strength rating for a compressive (inward) force along the minor axis 108. Conventional locking sleeves have been known to fail under a body weight load, enabling the gate to swing open. With an open gate, the carabiner may fail under a lesser load, or become unclipped and detached.

Another disadvantage of a conventional locking carabiner is that an additional twisting motion is generally required to release the sleeve 112, in order to open the gate. This may be undesirable or even impossible to effect in a number of situations, for example when a rock climber is dangling from a cliff face with only one free hand, and would like to clip his or her rope through the carabiner. The twisting release motion may also be undesirable because the rope or another object may rub against the sleeve and twist it, resulting in an accidentally unlocked carabiner.

Accordingly, there is a need for a carabiner having an improved gate structure.

BRIEF SUMMARY OF THE INVENTION

The present invention, in a number of embodiments, includes a carabiner having an inner gate and an outer gate. The outer gate may block foreign objects from pushing the inner gate to an open position.

In a first embodiment of the present invention, a carabiner is disclosed. The carabiner may have a generally C-shaped body including a first end region, a second end region, and an elongated section therebetween. An inner gate is mounted at the second end region and is pivotable between a closed position and an open position. An outer gate is also mounted at the second end region and is pivotable between a closed position and an open position. The gates may comprise wire gates, or the gates may comprise substantially cylindrical gates. One gate may comprise a wire gate, and the other gate may comprise a substantially cylindrical gate. Optionally, a locking sleeve may be provided on a gate.

In another embodiment of the present invention, a carabiner may include an inner gate and an outer gate, the outer gate protruding beyond the nose of the carabiner. The outer gate may be biased toward the nose of the carabiner.

Another embodiment of the present invention includes a method of preventing a carabiner from opening. The method comprises providing the carabiner, comprising a generally C-shaped body having a first end region, a second end region, an elongated section therebetween, and a first gate mounted proximate one end thereof at the second end region and being pivotable between a closed position having a distal end of the first gate engaged with the first end region and an open position having the distal end proximate the elongated section of the generally C-shaped body, mounting a second gate proximate one end thereof at the second end region, the second gate being pivotable between a closed position engaged with the first end region and an open position, extending away from the generally C-shaped body, and wherein the second gate is configured to provide a barrier to prevent objects from engaging with and pivoting the first gate to an open position.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1A:
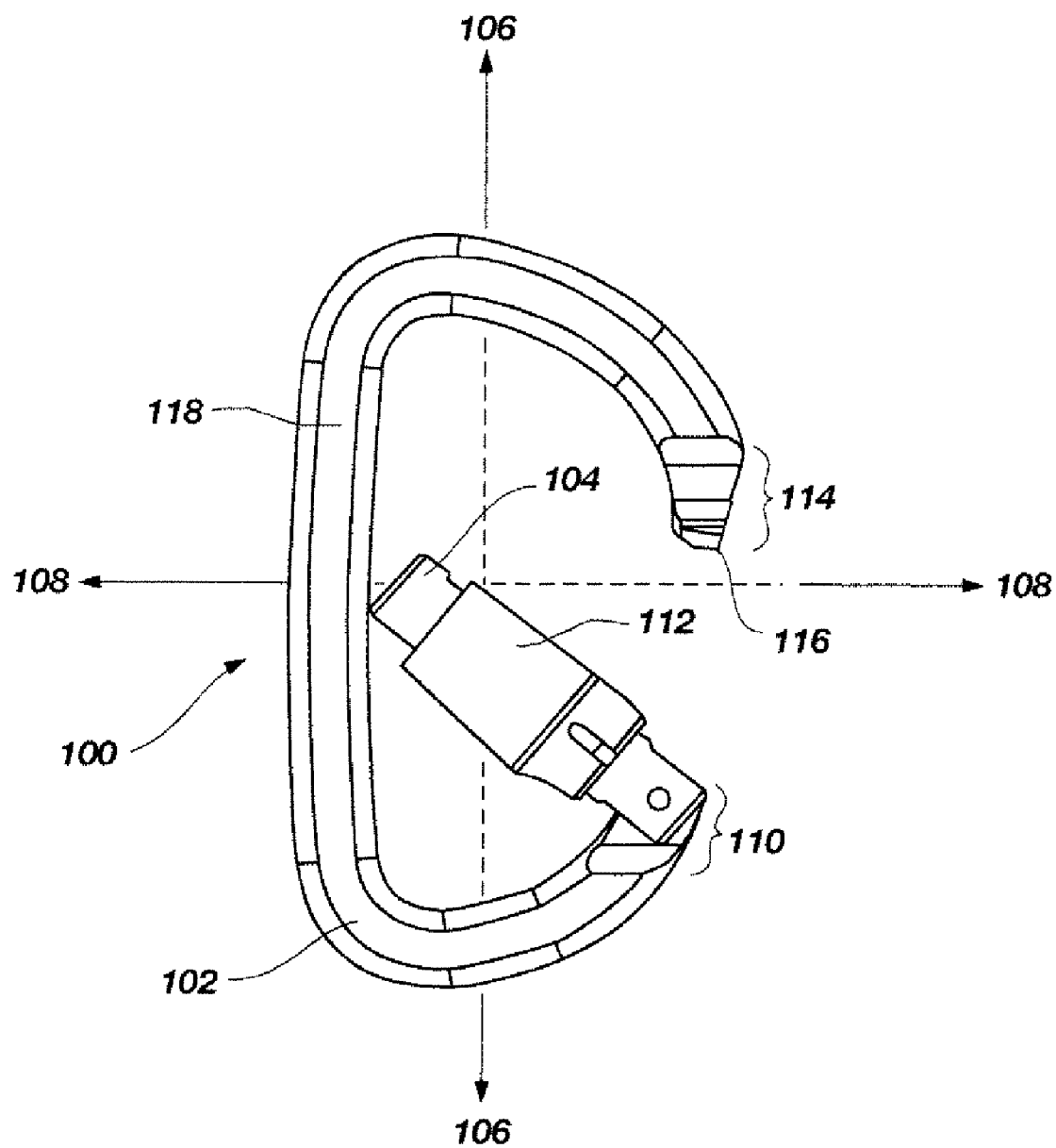
FIG. 1A illustrates a conventional locking carabiner in an open position.
Figure 1B:
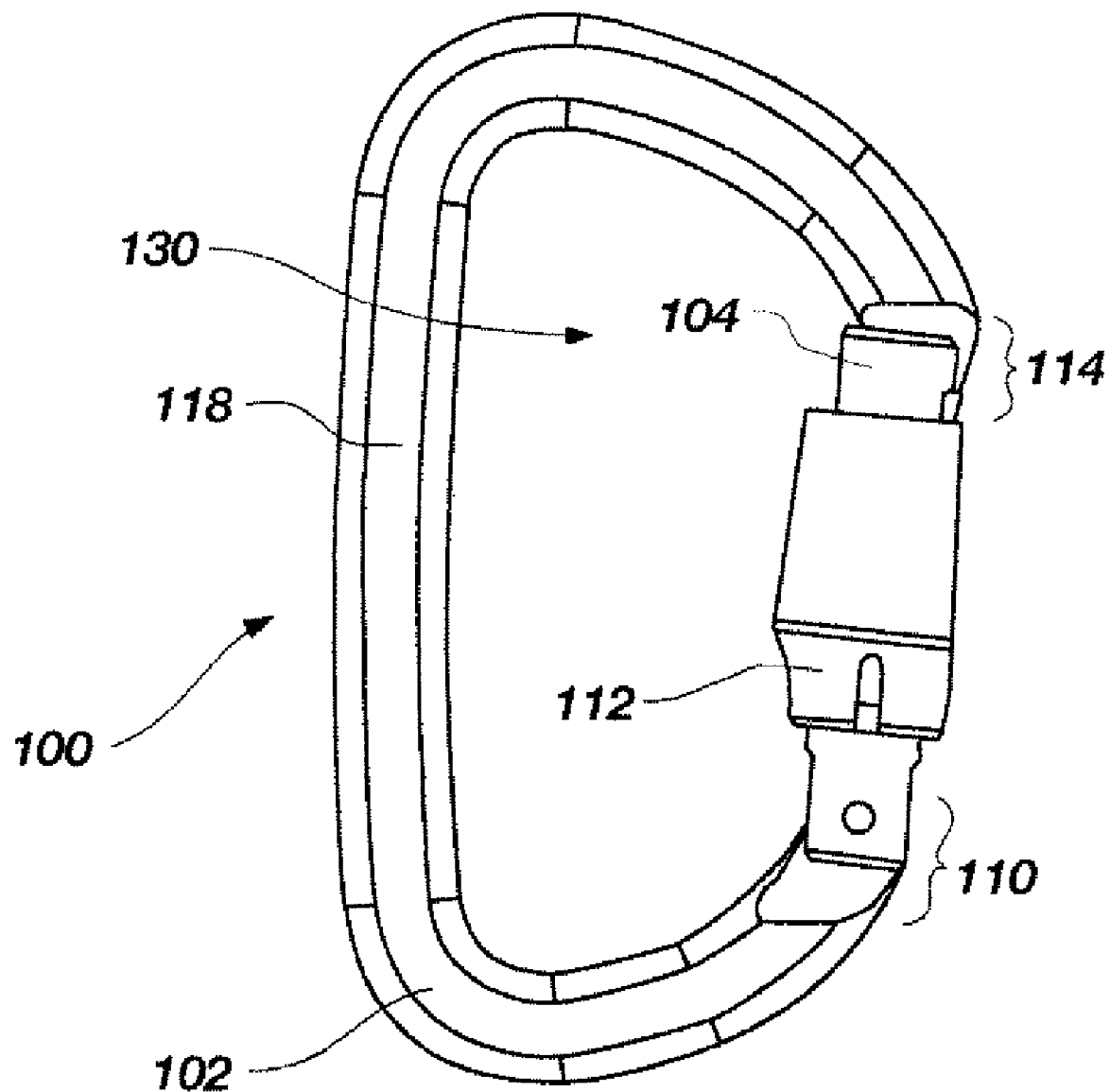
FIG. 1B illustrates the conventional locking carabiner of FIG. 1A in a closed position.

The present invention, in a number of embodiments, includes carabiners having a dual gate that may be used, for example, to retain a rope therewithin. As known in the art, the body of the carabiners of the present invention may be formed from a variety of metals and alloys, such as aluminum alloys and steel. The body of the carabiners may be shaped by bending into the desired shape, followed by stamping or machining to impart a desired cross-sectional configuration, and heat treating, if necessary or desired, to increase the strength or alter other material properties thereof. The term "generally C-shaped," as used herein, encompasses any style or configuration of carabiner body, including, by way of example and not limitation, oval, D-shaped, offset D-shaped, pear shaped and twisted. In the detailed description, which follows, like features and elements in the several embodiments are identified in the drawings with the same or similar reference numerals for the convenience of the reader.

Figure 2A:
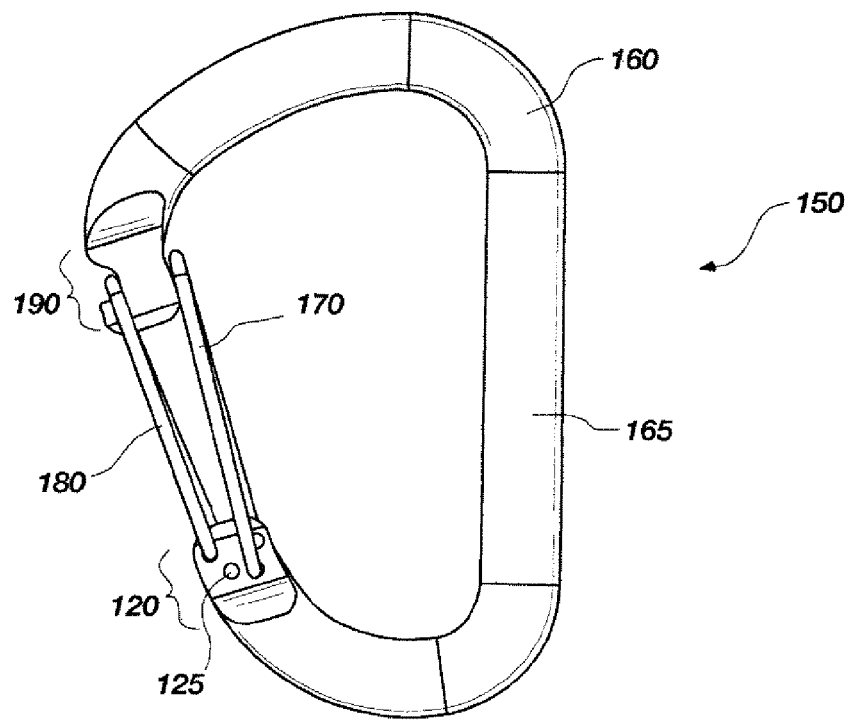
FIG. 2A illustrates a carabiner of an embodiment of the present invention.
Figure 2B:
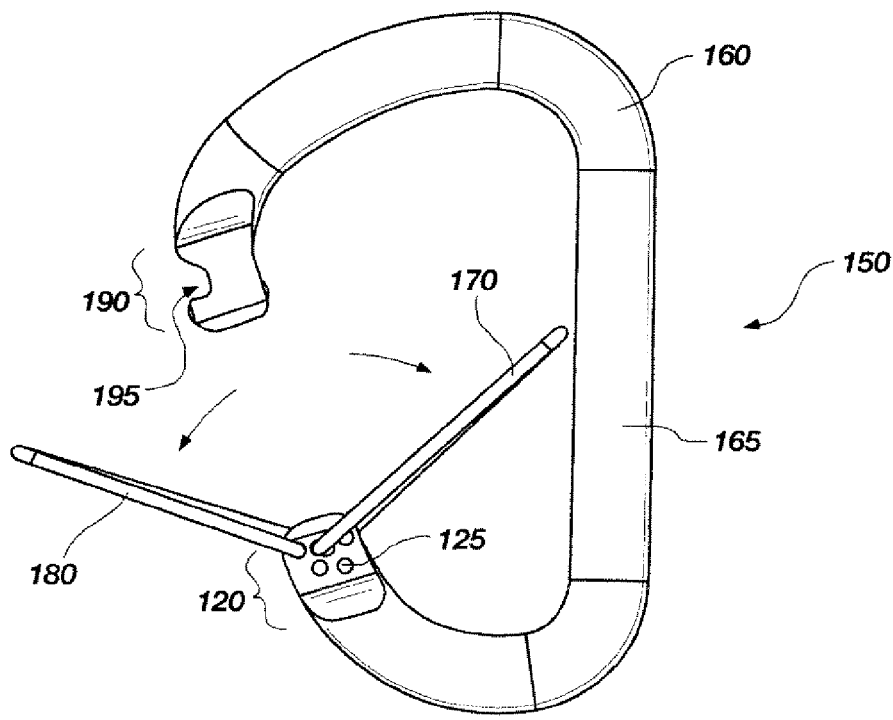
FIG. 2B illustrates the carabiner of FIG. 2A with the gates open.

A first embodiment of the present invention is depicted in FIGS. 2A and 2B. A carabiner 150 according to the first embodiment of the present invention comprises a generally C-shaped body 160, an inner gate 170, and an outer gate 180. The C-shaped body 160 includes a first end region or nose region 190, a spine 165, and a second end region or gate attachment area 120.

The gates 170, 180 may each be wire gates, as shown, each comprising a loop of wire secured at both ends thereof at the gate attachment area 120 on the C-shaped body 160. The gate attachment area 120 may include apertures 125 for receiving the wire ends. The gates 170, 180 may be rotatable about the wire ends to enable the gate 170 to be opened and closed manually. The gates 170, 180 are shown in a closed position in FIG. 2A and in an open position in FIG. 2B. The inner gate 170 may pivot toward the spine 165, to an open position within the C-shaped body 160. The exterior gate 180 may pivot away from the spine 165, to an open position outside the C-shaped body 160. Both the inner gate 170 and the outer gate 180 are biased toward the closed position. That is, each gate 170, 180 is biased toward the nose region 190 of the carabiner, and requires an external force to move to the open position. As depicted, the inner gate 170 is biased in the counterclockwise direction, and the outer gate 180 is biased in the clockwise direction.

The nose region 190 of the carabiner 150 may include a notch 195 for securing the outer gate 180. Under a longitudinal load, the outer gate 180 may engage with the notch 195, enabling a load to be carried by both the spine of the body 160 of the carabiner 150 and the outer gate 180 of the carabiner 150. The nose region 190 of the inside of the carabiner 150 may be smooth, preventing the carabiner 150 from snagging as it is clipped or unclipped.

Figure 3:
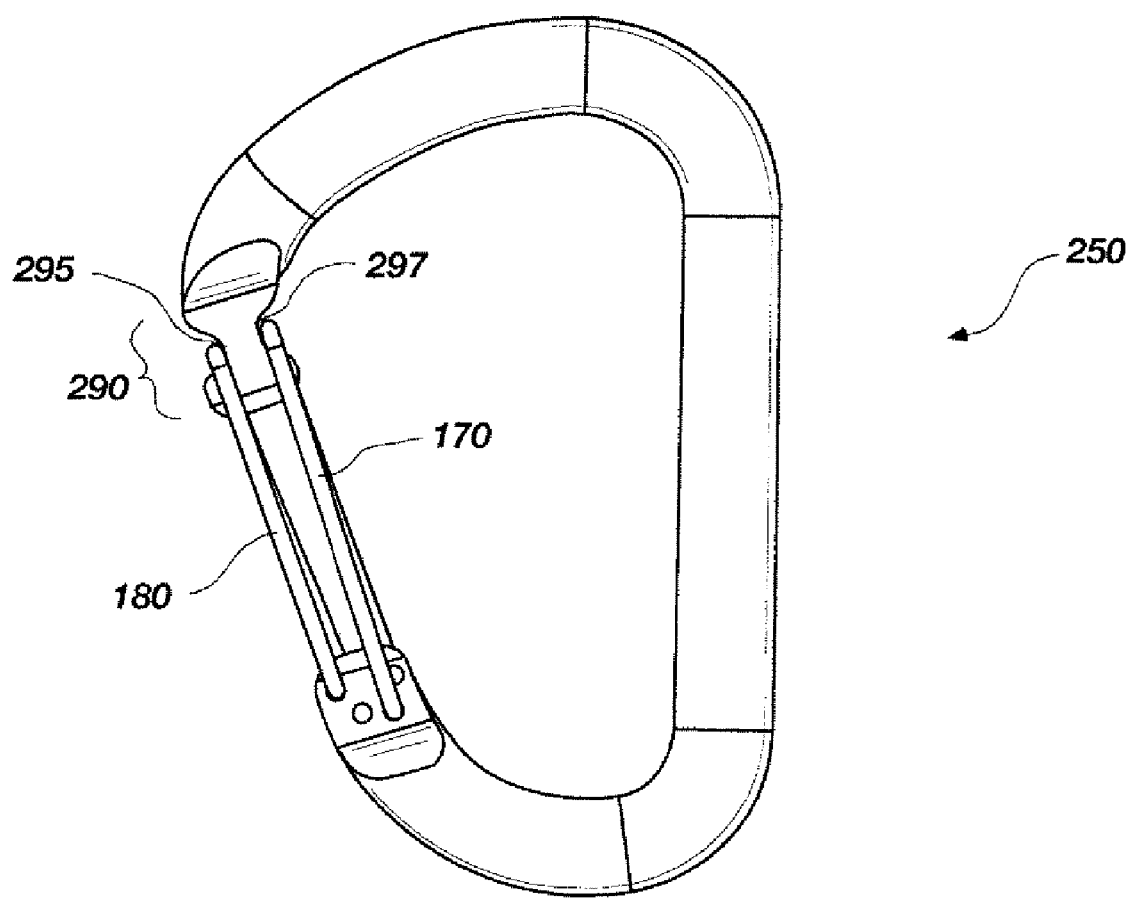
FIG. 3 illustrates a carabiner of another embodiment of the present invention.

A carabiner 250 according to a second embodiment of the present invention is shown in FIG. 3. The carabiner includes a nose region 290 and an inner gate 170 and an outer gate 180. The nose region may include two notches for mating with the gates of the carabiner 250. The inside of the nose region 290 of the carabiner 250 may include a notch 297 for mating with the inner gate 170, and the outside of the nose region 290 may include a notch 295 for engaging with the outer gate 180. Including the inner gate notch 297 and the outer gate notch 295 enables either gate, when closed, to share the longitudinal load with the spine of the carabiner with the other gate open. For example, the inner gate 170 may share the longitudinal load with the spine of the carabiner with the outer gate 180 in the open position. With both gates 170, 180 closed and engaged with the notches 295, 297, the nose region 290 of the carabiner 150 will be evenly loaded rather than being subjected to a torque from uneven loading. In yet another configuration, the inside of the nose region 190, 290 may be notched, and the outside of the nose region 190, 290 may be smooth.

The outer gate 180 guards the inner gate 170 from being pushed open through contact with a rock face or other foreign object. An inward force on the outer gate 180 only serves to push the outer gate 180 against the nose region 190, 290 of the carabiner 150, 250, keeping the outer gate 180 in the closed position. It is desirable to prevent the inner gate 170 from opening in order to maintain the closed-gate strength of the carabiner 150, 250, and to prevent the carabiner 150, 250 from coming unclipped and detached from any object that it has been attached to. It may also be desirable to maintain the inner gate 170 in a closed position to prevent a rope passing through the carabiner 150, 250 from becoming unclipped and detached.

Figure 4A:
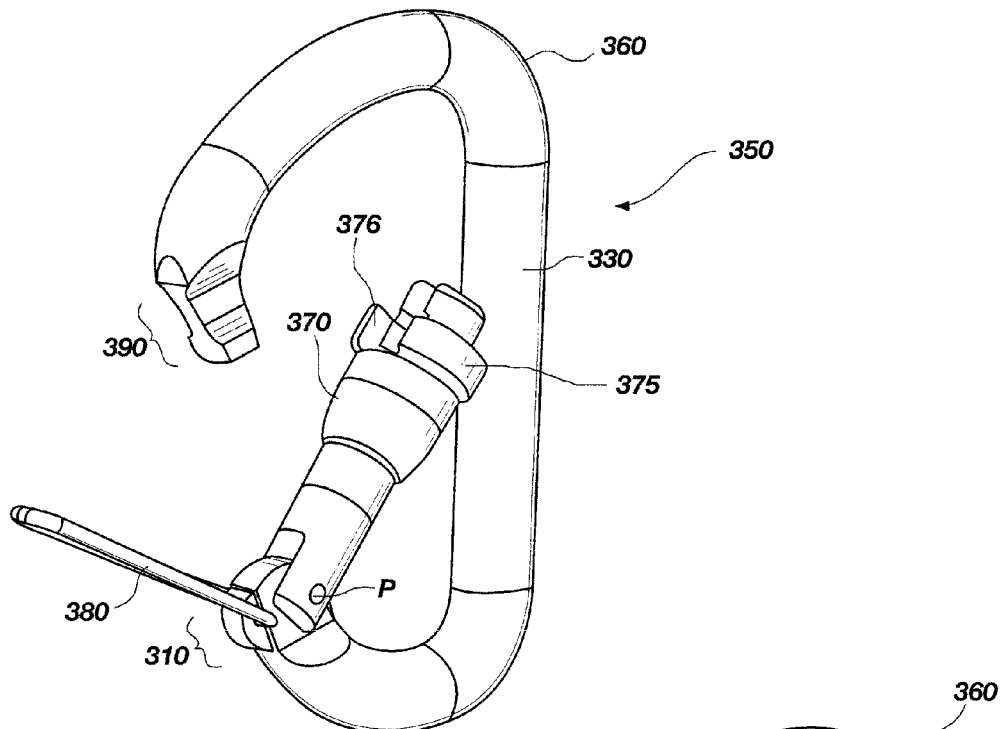
FIGS. 4A-4C illustrate yet another carabiner of yet another embodiment of the present invention.
Figure 4B:
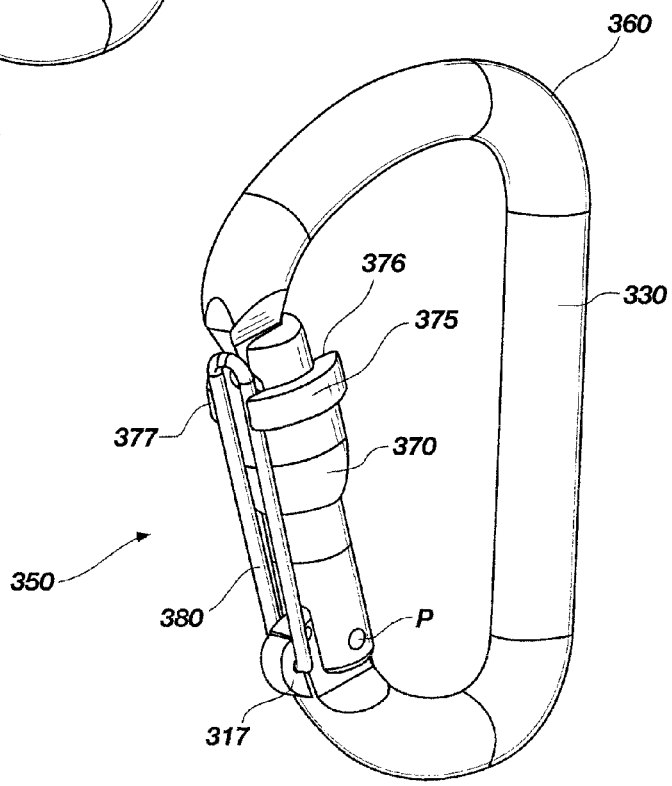
Figure 4C:
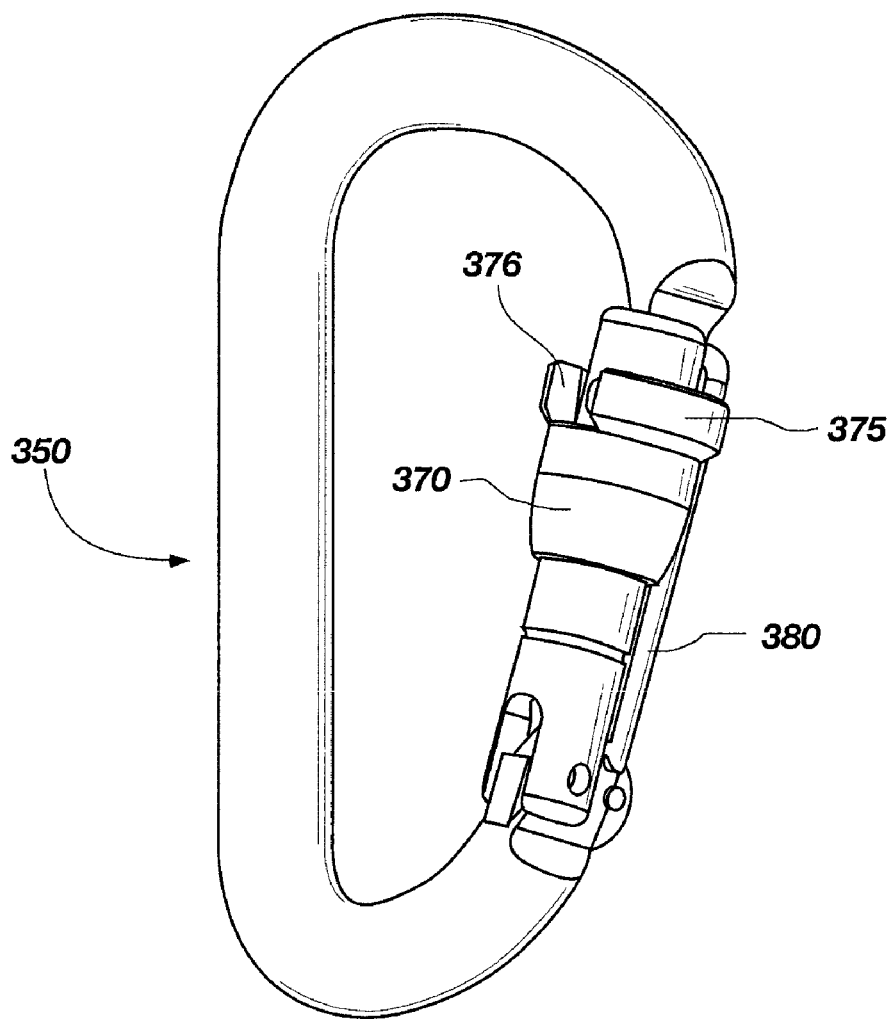

In another embodiment of the present invention, as shown in FIGS. 4A-4C, a carabiner 350 may include an inner gate 370 of a substantially solid, generally cylindrical, configuration. The inner gate 370 may include an internal biasing element such as a spring (not shown), which biases the inner gate 370 toward the nose region 390 to a closed position. An outer gate 380 may be a wire gate. The inner gate 370 may include a sleeve 375. The sleeve 375 may include a notch 376. With the sleeve 375 rotated to an unlocked position, the inner gate 370 may open and close freely. FIG. 4A depicts the inner gate 370 in an open position, and the sleeve 375 in an unlocked position with the notch 376 facing the nose region 390 of the carabiner 350. FIGS. 4B and 4C depict the inner gate 370 in a closed position and the sleeve 375 in a locked position, with the notch 376 facing the spine 330 of the carabiner 350.

The sleeve 375 may include a recessed area 377 for receiving a distal portion of the outer gate 380. In the locked position, the sleeve 375 may engage and block the nose region 390 of the carabiner 350, preventing the inner gate 370 from pivoting inward and opening. The outer gate 380, in a closed position, may engage with the recessed area 377 to prevent the sleeve 375 from rotating to an unlocked position. The carabiner 350 of FIG. 4B may be unlocked and opened by pivoting the outer gate 380 to an open position, rotating the sleeve 375 so the recessed area 377 faces the spine 330 and the notch 376 faces away from the spine 330, enabling the inner gate 370 to pivot inwardly to an open position.

A sleeve having a notch and a recessed area positioned thereon in configurations other than the depicted 180-degree opposition are within the scope of the present invention. The carabiner 350 depicted in FIGS. 4A-4C is a keylock carabiner; however, a carabiner having any suitable nose region, including without limitation a conventional, notched nose region, also known as a pin and hook, is within the scope of the present invention.

The inner gate 370 may be secured to the body 360 by a pin P (e.g., a rivet, screw, etc.) at the gate attachment area 310. The inner gate 370 may be rotatable about the pin P to enable the inner gate 370 to be opened and closed manually. The gate attachment area 310 may include apertures for receiving ends of the outer gate 380, which may be a wire gate. The apertures may be positioned on a protruding region 317 of the gate attachment area 310, enabling the inner gate 370 to pivot without interference with the outer gate 380 at the gate attachment area 310. A carabiner 350 having a non-protruding gate attachment area 310 is also within the scope of the present invention.

The sleeve 375 enables lateral support of the outer gate 380 in the closed position, and also enables a redundant locking of the inner gate 370 in a closed position. The carabiner 350 is thus a "redundantly locked" carabiner. The sleeve 375, in a locking position, prevents the inner gate 370 from opening. The outer gate 380, closed and engaged with the recessed area 377, prevents the sleeve 375 from rotating to an open position. Thus, both the outer gate 380 and the sleeve 375 must be manipulated to unlock the carabiner 350, enabling the inner gate 370 to be manually opened by a user. The carabiner 350 will not become accidentally unlocked, even if a rope or other object exerts a rotational force on the sleeve 375. Disengaging the outer gate 380 is simple, even for an operator with cold, stiff hands.

Figure 5:
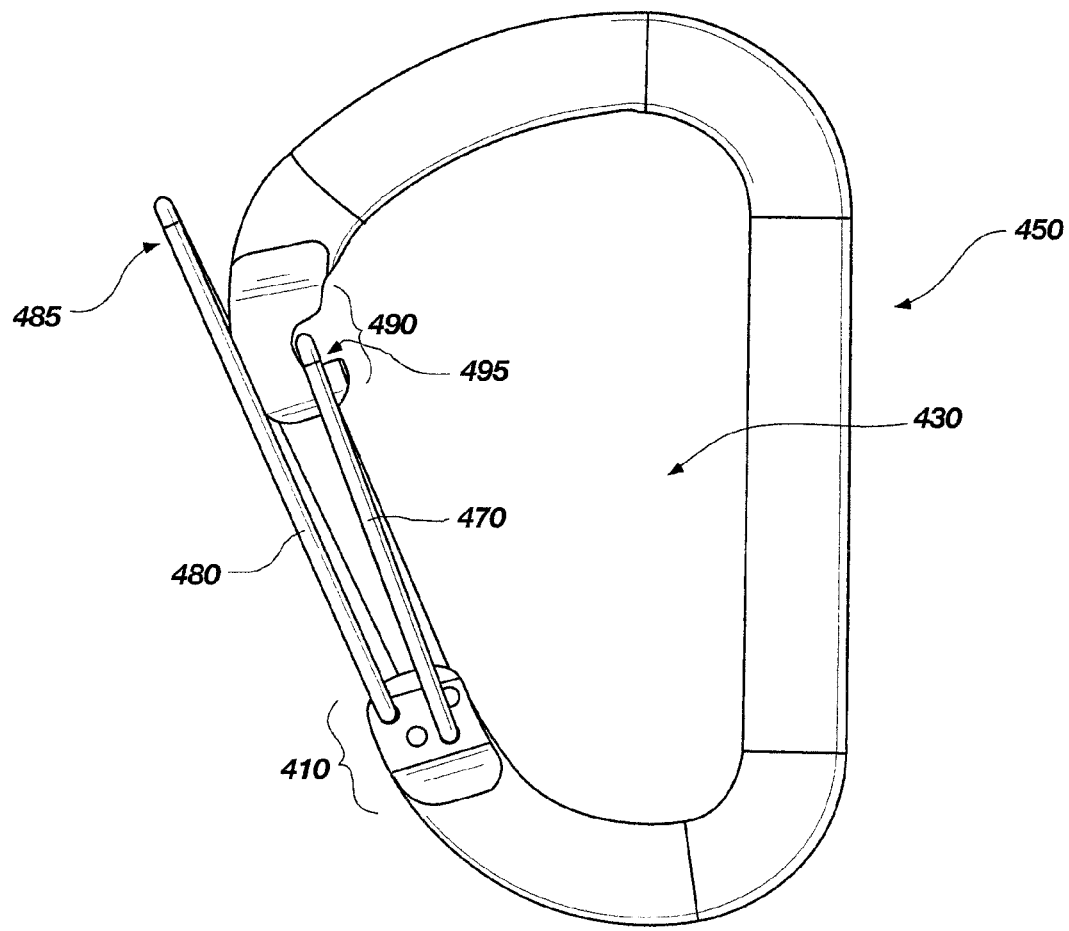
FIG. 5 illustrates a carabiner of still another embodiment of the present invention.

FIG. 5 depicts yet another embodiment of the present invention. A carabiner 450 may include an inner gate 470 and an outer gate 480. The outer gate 480 may be longer than the inner gate 470, and may protrude beyond the nose region 490 of the carabiner 450. The outer gate 480, as shown in a closed position, may contact an outer surface of the nose region 490, and extend therebeyond. As set forth hereinabove with respect to the carabiner 150 depicted in FIGS. 2A and 2B, the outer gate 480 may be biased toward the spine of the carabiner 450, and the inner gate 470 may be biased away from the spine of the carabiner 450. Thus, both gates 170, 180 are biased toward the closed position, against the nose region 490 of the carabiner 450. An end of the inner gate 470 may be partially received by a notch 495 of the nose region 490.

A portion 485 of the outer gate 480, which extends beyond the nose region 490, may be easily engaged and actuated by a user to open the outer gate 480. The outer gate 480 may serve to protect the inner gate 470 from being levered open, and to prevent a rope from undesirably clipping itself into or out of the carabiner 450.

The configuration of carabiner 450 may be particularly desirable for use by a climber as part of a "quickdraw." The quickdraw may comprise two carabiners attached by a loop of webbing. A climber ascending a cliff needs to attach his or her rope into a piece of protection, for example a bolt affixed to a cliff, or traditional protection such as a nut or a camming unit, which the climber wedges into the rock. The upper carabiner of the quickdraw may be clipped (attached) to the protection and the rope may be clipped to the lower carabiner of the quickdraw. It may be desirable for the lower carabiner to comprise a carabiner 450 of the present invention.

In use, the quickdraw may first be attached to the protection via the upper carabiner. The lower carabiner 450 of the quickdraw may be oriented with the gates 470, 480 extending from the gate attachment area 410 down toward the ground. The climber may reach toward the carabiner 450, with the rope in his or her hand. With the single hand, grasping the rope, the climber may place his or her middle finger on the body of the carabiner 450. Using their thumb, the rope may be pressed upward, between the nose region 490 and the extending portion 485 of the outer gate 480. The rope may drive the outer gate 480 open, and the rope may be pushed upward and inward, around the carabiner nose region 490. The rope may now engage and urge the inner gate 470 open, dropping the rope into the carabiner opening 430. The carabiner 450, having one-handed operation, enables the climber to attach their rope to his or her protection quickly and easily, yet prevents the rope from becoming unclipped, even if the climber has mistakenly back-clipped.

In a situation with a falling climber, even if the rope falls across the gate of the carabiner 450, an inward force on the outer gate 480 will not open the carabiner 450. Thus, the rope will remain clipped into the carabiner 450, and the protection will arrest the fall.

Preventing the rope from becoming unclipped (detached) may be particularly desirable for the protection nearest the ground, as falling and having the rope unclip from the protection may result in a ground fall. Higher on the cliff, the climber may be attached to more protection points, at successively higher places. Even if the rope comes unclipped from the highest point of protection, the fall may be arrested on a lower protection point before the climber reaches the ground. The carabiner 450 is desirable for many other applications as well.

It is also within the scope of the present invention for the inner gate 170, 370, 470 to be an angled gate, also known as a swing gate or an offset gate. In the open position, an inner gate 170, 370, 470 (which is an angled gate) may not interfere with the spine of the carabiner. Rather, the inner gate 170, 370, 470 will angle to the side and may pass beyond the spine and provide a wider gate opening.

Some climbers prefer a smaller size carabiner because they are lighter, among other reasons. However, a smaller carabiner is more susceptible to having a rope or other object twist, lever, or otherwise interfere with the gate. A carabiner of the present invention, while having two gates, may be manufactured in small sizes, and provides an outer gate as a block to prevent the inner gate from opening. A carabiner of the present invention, having two gates, may weigh less than a conventional locking carabiner of a comparable size.

The dual-gate carabiners 150, 250, 450 of the present invention provide a means to block an inner gate 170, 470 of a carabiner from opening, yet does not rely on a twisting motion to block or unblock the inner gate. Thus, the dual-gate carabiners 150, 250, 450 of the present invention may be easily and swiftly operated, yet are not susceptible to accidental unlocking. In addition, dirt, snow, ice, and other foreign materials will not cause the dual-gate carabiner to malfunction. A conventional, locking carabiner with a sleeve is subject to such blockages. A dual-gate carabiner is self-cleaning, discharging foreign matter as the gates are actuated. The two gates of a dual-gate carabiner of the present invention may have a lesser cross-sectional area than the gate and sleeve of a conventional locking carabiner of a comparable size. Thus, the dual-gate carabiner may pass or rotate unimpeded through devices that a comparable size conventional locking carabiner would not fit.

Additionally, the gate opening may be wider in a dual-gate carabiner of the present invention, compared to the gate opening of a comparably sized conventional locking carabiner. An operator may easily confirm that the outer gate 180, 380, 480 of a carabiner 150, 250, 350, 450 of the present invention is closed, blocking the inner gate 170, 370, 470 from accidentally opening under an inwardly exerted force. In comparison, it may require close inspection to confirm that a sleeve of a conventional locking carabiner is in a locked position. Furthermore, the action required to manipulate and open the outer gate 180, 380, 480 is intuitive, while conventional locking carabiner sleeves may twist to an unlocked position, or require pushing the sleeve up or down before twisting, or even require manipulation of a release button in order to twist or slide the sleeve to an unlocked position.

Unattaching or unclipping a carabiner 150, 250, 350, 450 of the present invention from an object may also be a simple, one-handed operation. A user may manipulate the inner gate 170, 370, 470 to an open position, and turn the carabiner 150, 250, 350, 450 so the object engages the outer gate 180, 380, 480. Pulling the carabiner 150, 250, 350, 450 away from the object forces the outer gate 180, 380, 480 to an open position, and the carabiner 150, 250, 350, 450 may be released.

Although the foregoing description contains many specifics, these are not to be construed as limiting the scope of the present invention, but merely as providing certain exemplary embodiments. Similarly, other embodiments of the invention may be devised, which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A carabiner comprising:
    a generally C-shaped body having a first end region, a second end region, and an elongated section therebetween;
    an inner gate mounted proximate one end thereof at the second end region and being pivotable between a closed position having a distal end of the inner gate engaged with the first end region and an open position having the distal end proximate the elongated section of the generally C-shaped body, the inner gate comprising a substantially cylindrical body, and the outer gate comprises a wire gate; and
    an outer gate mounted proximate one end thereof at the second end region and being pivotable between a closed position engaged with the first end region and an open position, extending away from the generally C-shaped body, the outer gate comprising a wire gate; and
    a sleeve disposed about the inner gate.

2. The carabiner of claim 1, wherein the outer gate is biased toward the first end region.

3. The carabiner of claim 1, wherein the inner gate and the outer gate each comprise a wire gate.

4. The carabiner of claim 3, wherein the first end region includes a notch configured to engage with the outer gate in the closed position thereof.

5. The carabiner of claim 3, wherein the first end region includes a notch configured to engage with the inner gate in the closed position thereof.

6. The carabiner of claim 1, wherein the sleeve is rotatable between a first position for locking the inner gate in the closed position thereof and a second position for unlocking the inner gate from the closed position.

7. The carabiner of claim 6, wherein at least one of the outer gate and the sleeve are configured for mutual engagement to impede rotational movement of the sleeve.

8. The carabiner of claim 1, wherein the outer gate protrudes beyond the first end region of the C-shaped body when in a closed position.

9. A method of preventing a carabiner from opening, comprising:
    providing a carabiner comprising a generally C-shaped body having a first end region, a second end region, an elongated section therebetween, and a first gate mounted proximate one end thereof at the second end region and being pivotable between a closed position having a distal end of the first gate engaged with the first end region and an open position having the distal end proximate the elongated section of the generally C-shaped body;
    mounting a second gate proximate one end thereof at the second end region, the second gate being pivotable between a closed position engaged with the first end region and an open position, extending away from the generally C-shaped body; wherein the second gate is configured to provide a barrier when in the closed position to prevent objects from engaging with and pivoting the first gate to an open position; and
    rotating a sleeve about the inner gate in the closed position thereof to prevent the inner gate from pivoting to the open position thereof.

10. The method of claim 9, further comprising biasing the first gate away from the elongated section.

11. The method of claim 9, further comprising biasing the second gate toward the elongated section.

12. A carabiner comprising:
    a generally C-shaped body having a nose region, a gate attachment area, and a spine section therebetween;
    an inner gate attached to the gate attachment area and biased toward the nose region;
    an outer gate attached to the gate attachment area and biased toward the nose region; and
    a sleeve rotatably disposed about the inner gate to selectively lock and unlock the inner gate from engagement with the nose region.

13. The carabiner of claim 12, wherein the inner gate is biased away from the spine section and the outer gate is biased toward the spine section.

14. The carabiner of claim 12, wherein the inner gate and the outer gate each comprise a wire gate.

15. The carabiner of claim 12, wherein the inner gate comprises a substantially cylindrical body, and the outer gate comprises a wire gate.

16. The carabiner of claim 12, wherein at least one of the outer gate and the sleeve are configured to impede rotational movement of the sleeve when mutually engaged.

17. The carabiner of claim 12, wherein the outer gate protrudes beyond the first end region of the generally C-shaped body when in a closed position.

* * * * *

UNITED STATES PATENT AND TRADEMARK OFFICE
CERTIFICATE OF CORRECTION

| | | |
|---|---|---|
| PATENT NO. | : 7,946,006 B2 | Page 1 of 1 |
| APPLICATION NO. | : 11/827380 | |
| DATED | : May 24, 2011 | |
| INVENTOR(S) | : Rocke P. Thompson | |

It is certified that error appears in the above-identified patent and that said Letters Patent is hereby corrected as shown below:

On the title page:
In ITEM (56) References Cited
   OTHER PUBLICATIONS
    Page 2, 2nd column, 1st line of the
      1st entry (line 5),      change "CMC Resuce OX" to --CMC Rescue XL--

In the specification:
    COLUMN 2, LINE 21,    change "carabiner from" to --carabiner 100 from--
    COLUMN 2, LINE 23,    change "opening," to --opening 130,--
    COLUMN 4, LINE 10,    change "gate 170" to --gates 170, 180--
    COLUMN 4, LINE 18,    change "carabiner," to --carabiner 150,--
    COLUMN 4, LINE 25,    change "spine" to --spine 165--
    COLUMN 4, LINE 31,    change "The carabiner" to --The carabiner 250--
    COLUMN 4, LINE 33,    change "The nose region" to --The nose region 290--
    COLUMN 4, LINE 34,    change "gates" to --gates 170, 180--
    COLUMN 4, LINE 41,    change "carabiner" to --carabiner 250--
    COLUMN 4, LINE 44,    change "carabiner 150" to --carabiner 250--
    COLUMN 5, LINE 64,    change "gates 170, 180" to --gates 470, 480--

Signed and Sealed this
Fifth Day of February, 2013

Teresa Stanek Rea
*Acting Director of the United States Patent and Trademark Office*